Aug. 15, 1939.  S. W. ROLPH  2,169,771

STORAGE BATTERY

Filed June 17, 1938

INVENTOR.
SAMUEL W. ROLPH
BY Kwis Hudson & Kent
ATTORNEYS

Patented Aug. 15, 1939

2,169,771

UNITED STATES PATENT OFFICE 2,169,771

STORAGE BATTERY

Samuel W. Rolph, Shaker Heights, Ohio, assignor to Willard Storage Battery Company, Cleveland, Ohio, a corporation of West Virginia Application June 17, 1938, Serial No. 214,259

5 Claims. (Cl. 136—177)

This invention relates to storage batteries and has for its chief object to provide certain improvements which in one aspect pertain to the filling of the battery and in another aspect to the venting thereof.

Storage batteries with separate filling and vent openings have been used or at least proposed for use. With these batteries it is proposed that when the attendant desires to fill the battery cell he will remove the cap which normally closes the filling opening and obstruct the vent opening by holding his finger over it. When the level of the electrolyte reaches the bottom of the annular skirt which extends down into the battery from the filling opening at the top of the battery it indicates to the attendant that sufficient water or electrolyte has been added to the battery.

With certain battery installations on automobiles and particularly with batteries located under the hood of recent models, the location of the battery is such that this procedure cannot be conveniently followed.

The principal object of the present invention is to provide a cell cover construction such that the water or electrolyte can be added to the cell more conveniently than with the constructions heretofore used and without danger of overfilling. It is a particular object of the invention to avoid the necessity of the operator holding his finger over the vent opening while the liquid is being supplied to the cell through the filling opening and through the tube or skirt extending downwardly therefrom.

A further object is to provide a cover with separate filling and vent openings and having a construction such that there is less loss of electrolyte through gassing than with batteries having vent openings as used or proposed for use heretofore.

In carrying out my invention and in the attainment of the objects above enumerated, a construction is provided such that instead of the attendant removing the filling caps and laying them down on the battery and then filling one cell after another and while filling each cell holding his finger over the vent opening to avoid overfilling, the cap and the venting means are so formed that the cap itself when removed from the filling opening can be used to temporarily close and seal the vent opening during the filling operation.

Further features of the invention include the provision on the lower side of the cover of contiguous and preferably integrally joined skirts for the filling opening and venting means respectively, the one for the filling opening being unslotted and the one for the venting means being slotted. The top of the cover is provided with a boss or upward extension a portion of which in line with the unslotted skirt is threaded to receive the filling cap and another portion of which in line with the slotted skirt is elevated sufficiently so that it may receive one or more baffles and constitute a condensing chamber for the gas bubbles and therefore prevent the loss of electrolyte through the vent opening which is provided above this portion of the boss. This vent opening is preferably formed in a tapered protuberance or nipple at the top of the condensing chamber, and the filling cap is preferably provided at its lower end with a sealing ring or gasket which will fit over this nipple so as to seal the opening and prevent the escape of air during the filling operation.

The invention may be further briefly summarized as consisting in certain novel details of construction and combinations and arrangements of parts which will be described in the specification and set forth in the appended claims.

In the accompanying sheet of drawings wherein I have shown an embodiment of my invention which operates with high efficiency—

Figure 1:
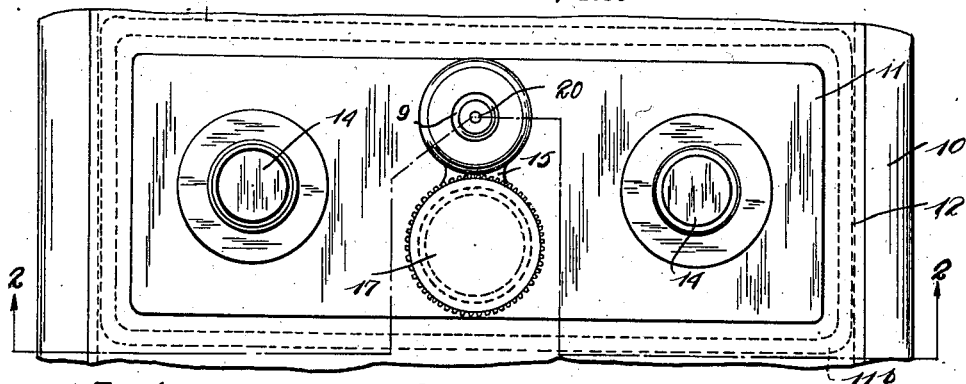
Fig. 1 is a top plan view of a portion of the improved battery which may have any number of cells but only one cell of which is here illustrated.
Figure 2:
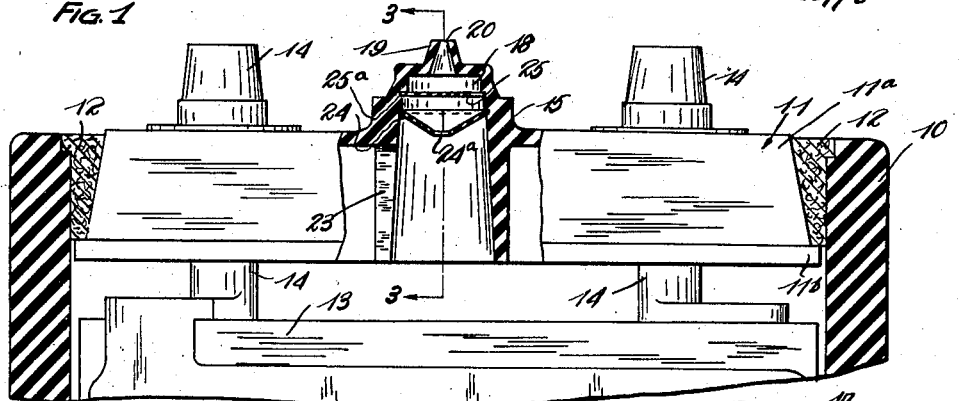
Fig. 2 is a vertical sectional view of the upper portion of the battery taken substantially along the irregular line 2—2 of Fig. 1.
Figure 3:
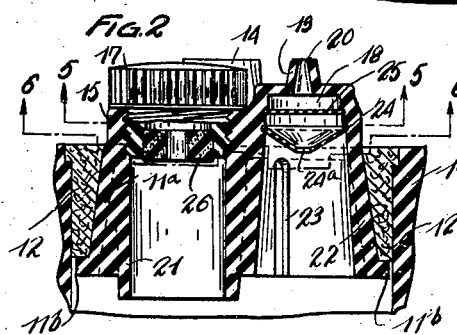
Fig. 3 is a fragmentary transverse sectional view substantially along the line 3—3 of Fig. 2, showing the filler cap in its usual position.
Figure 4:
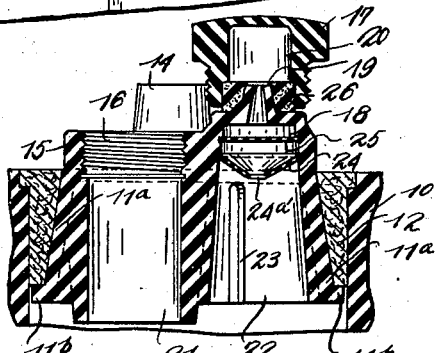
Figures 5, 6:
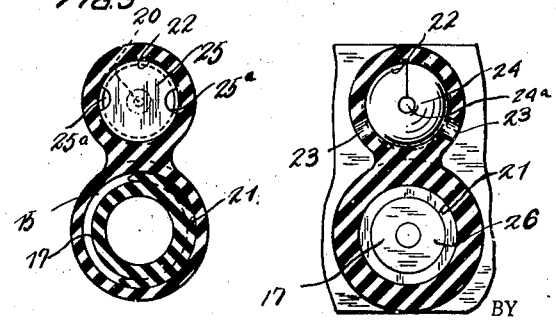

Fig. 4 is a similar view showing the filling cap removed from the filling opening and placed over the nipple containing the vent opening so as to seal the same while the cell is being filled; and Figs. 5 and 6 are fragmentary horizontal sectional views substantially along the lines 5—5 and 6—6 respectively of Fig. 3.

Referring now to the drawing, 10 represents the battery case which may be formed to accomodate any desired number of cells. Individual cell covers are usually employed and one such cover is shown at 11. The cover here shown is provided with a marginal skirt 11a at the bottom of which is the usual flange 11b which fits closely into the cell compartment. The usual sealing compound 12 seals and holds the cover in the upper part of the cell compartment.

In the cell is the battery element shown conventionally at 13 composed as usual of positive and negative plates and intervening separators, the positive and negative plates being provided with upstanding posts 14 which extend up through openings provided near opposite ends of the cell cover 11, the posts being sealed in the cover in any convenient or desired manner.

The middle portion of the cover 11 on both its upper and under sides is constructed differently than heretofore. The top of the cover has a transverse boss 15 which extends the full width of the flat top portion of the cover. In one part of this boss is formed the filling opening which is internally threaded as shown at 16 to receive the threaded shank of the filling cap 17 the upper end of which is flanged or extended laterally and knurled at its periphery in the usual manner. At the side of this threaded opening 16 the boss is extended upwardly somewhat so as to form a condensing chamber 18 for the gas bubbles, and at the top of this condensing chamber there is a hollow tapered protuberance or nipple 19 with a relatively small vent opening at its upper end, the passageway through the hollow protuberance communicating with the upper part of the condensing chamber.

On the under side of the cover opposite the boss 15 there are two contiguous and preferably integrally joined skirts 21 and 22. The skirt 21 is in line with and constitutes a continuation of the filling opening 16. The wall of this skirt is unslotted and constitutes with the upper threaded opening 16 a continuous well which extends down to and preferably slightly below the bottom of the marginal flange 11b of the cover as shown in Figs. 3 and 4.

The skirt 22 has one or more vertical slots 23 extending from the lower end of the skirt to the under side of the flat upper part of the cover or to the lower end of the chamber 18. In this chamber means is provided to break the gas bubbles which pass upwardly from the surface of the electrolyte when the battery is on charge and permit the condensed electrolyte to fall back into the battery. This occurs in part when the bubbles strike the upper wall of the chamber 18, but I prefer to increase this bubble breaking action by the addition of one or more transverse baffles in the chamber 18. Although I have found that in some instances a single baffle is sufficient, in this case I provide two baffles 24 and 25 which may be formed of thin hard rubber or equivalent material inert to the electrolyte. These baffles are preferably sprung into place and at their peripheries engage in grooves in the side wall of the chamber 18. In this instance the lower baffle 24 is conical in shape with the cone inclined downwardly toward the center where it is provided with a vent opening 24a. The upper baffle is provided with one or more vent openings staggered with respect to the vent opening 24a, and in this instance has adjacent its periphery a pair of vent openings 25a. As the vent openings are at the periphery of this baffle, the latter is made flat or, if not flat, is made slightly bowed upward at the center.

Referring again to the filling cap 17, this cap is preferably hollow but it is imperforate in the sense that it has no vent opening as is the case with the usual cap or vent plug, and to avoid the likelihood of gas escaping along the threads and from under the head of the cap, the under side of the head may have a gasket so that when the cap is screwed down tightly a seal against the leakage of gas will be formed. In accordance with an important feature of my invention, means is provided whereby when the cap is unscrewed it may be placed in sealing relation with the vent opening 20, and since the vent opening 20 is at the top of the hollow tapered protuberance or nipple 19, I provide in the lower end of the filling cap a plug 26 of soft rubber or other yieldable inert material which will serve as a gasket seal for the protuberance 19 and its vent opening 20. This plug is in the form of an annulus or washer-like member which is fitted into the lower end of the cavity of the cap and is preferably cemented in place. It has a central opening extending therethrough of a size such that when the cap is removed from its normal position it can be pressed down over the protuberance and will fit thereon with sufficient tightness to act as a seal during the filling operation.

In practice, when it is desired to fill the battery the attendant will remove the caps and fit them over the nipples 19 instead of laying them down on the top of the battery as has been the custom heretofore. He will then add water to the cells until the electrolyte rises in each of the hollow skirts 21. Since air is trapped on the under side of the cover due to the fact that the caps are now closing the vent openings 20, the cells can all be accurately filled to a predetermined level. When this is accomplished the caps are removed from the nipples, whereupon the electrolyte recedes from the wells in the skirts 21 and the caps are again restored to their usual place so as to close and seal the filling openings.

This construction possesses advantages over existing batteries having so-called automatic leveling cover constructions in that its operation is simple and will require a minimum of education to be universally adaptable for use by service station attendants and car users. In case the attendant neglects to restore the filling caps no harm is done because the nature of the fit of the plugs 26 over the nipples 19 is such that vibration of the battery in the car will cause the caps to fall off the nipples and permit the electrolyte to be restored to its normal level without any danger of the vent openings being left closed long enough to cause dangerous pressure to be built up on the under side of the covers.

While I have shown the preferred construction, I do not desire to be confined to the precise details or arrangements shown but aim in my claims to cover all modifications which do not involve a departure from the spirit and scope of the invention.

Having thus described my invention, I claim:

1. A storage battery having a cover with a filling opening and with a depending imperforate skirt in line with the filling opening and extending to substantially the desired liquid level and separate venting means including a hollow protuberance with a relatively small vent opening at the top, a removable imperforate cap normally closing said filling opening and provided at its lower end with a yieldable member such that it will receive the protuberance and seal the vent opening when the cap is removed from the filling opening and pressed down onto the protuberance.

2. A storage battery cover having a marginal skirt adapted to be fitted into a cell of the battery, said cover having inside the marginal skirt contiguous annular skirt portions one with an unslotted wall extending to substantially the desired liquid level and the other with a slotted wall, said cover having at the top a transverse boss in a portion of which a filling opening is formed in line with the unslotted skirt portion and the remainder of the boss forming a hollow condensing chamber substantially in line with the slotted skirt portion and provided with one or more baffles, the top of the chamber having a hollow protuberance terminating in a relatively small vent opening, and a removable imperforate cap normally closing the filling opening and having means at its lower end for forming a substantially airtight fit on said protuberance when it is applied thereto after being removed from the filling opening.

3. A storage battery cover provided with a filling opening and independent venting means in the form of a protuberance having a relatively small vent opening and a removable imperforate cap for the filling opening, said cap having a shank for engagement with the wall of the filling opening, said shank having at its lower end means adapted to form a close substantially airtight fit on said protuberance when the cap is applied thereto after being removed from the filling opening, said cover having on the under side in line with said filling opening a skirt with an imperforate wall extending downwardly to substantially the desired liquid level.

4. A cover for a storage battery cell having a marginal depending skirt and having depending from its under side inside the marginal skirt two skirt portions one having an imperforate wall extending downwardly to substantially the desired liquid level, the other skirt portion being slotted for substantially its full length, and said cover having on the upper side thereof two elevated portions one having an opening in line with the skirt portion having the imperforate wall and adapted to receive a removable imperforate cap, the other elevated portion on the top of the cover having a chamber formed therein in line with the slotted skirt portion and provided with a small vent opening, the marginal skirt, the skirt portions, and the elevated portions being formed integral with the cover.

5. A storage battery comprising a case having a cover with a marginal depending skirt fitted down into the top of the case and sealed therein, said cover being provided with a substantially flat top portion having on the under side thereof inside the marginal skirt two skirt portions one having an imperforate wall extending downwardly to substantially the desired liquid level and the other being slotted for substantially its full length, and said top portion of the cover having on the upper side thereof two elevated portions one having a filling opening in line with the skirt portion with the imperforate wall and the other having a chamber formed therein in line with the slotted skirt portion and provided with a small vent opening, the marginal skirt, the skirt portions, and the elevated portions being formed integral with the cover, a removable imperforate cap closing the filling opening, and one or more baffles in said chamber.

SAMUEL W. ROLPH.